(12) United States Patent
Hamilton et al.

(10) Patent No.: US 8,317,914 B2
(45) Date of Patent: *Nov. 27, 2012

(54) FIBER CEMENT BOARD WITH MODIFIED FIBER

(75) Inventors: Robert T Hamilton, Seattle, WA (US); David J O'Callaghan, Bonney Lake, WA (US); Hugh West, Seattle, WA (US)

(73) Assignee: Weyerhaeuer NR Company, Federal Way, WA (US)

( * ) Notice: Subject to any disclaimer, the term of this patent is extended or adjusted under 35 U.S.C. 154(b) by 385 days.

This patent is subject to a terminal disclaimer.

(21) Appl. No.: 12/475,206

(22) Filed: May 29, 2009

(65) Prior Publication Data

US 2010/0300329 A1      Dec. 2, 2010

(51) Int. Cl.
*C04B 16/02*      (2006.01)

(52) U.S. Cl. .......... 106/644; 106/730; 428/703; 52/344; 156/39

(58) Field of Classification Search ................... 106/644, 106/730; 428/703; 52/344; 156/39
See application file for complete search history.

(56) References Cited

U.S. PATENT DOCUMENTS

| | | | |
|---|---|---|---|
| 3,943,079 A | 3/1976 | Hamed | |
| 6,676,745 B2 | 1/2004 | Merkley et al. | |
| 7,344,593 B2 | 3/2008 | Luo et al. | |
| 2005/0269728 A1 | 12/2005 | Roos | |
| 2006/0117655 A1* | 6/2006 | Bodycomb et al. | 47/59 S |
| 2010/0300330 A1* | 12/2010 | Hamilton et al. | 106/805 |

* cited by examiner

*Primary Examiner* — Paul Marcantoni
(74) *Attorney, Agent, or Firm* — John M. Crawford

(57) ABSTRACT

A building material product comprising a cementitious binder, an aggregate and cellulose reinforcing fibers wherein the cellulose reinforcing fibers have been treated with cationic or nonionic oil. The resulting fiber when included in a fiber cement composite results in improved deflection of the composite at peak loading as well as improved impact strength while maintaining overall board strength.

6 Claims, No Drawings

FIBER CEMENT BOARD WITH MODIFIED FIBER

BACKGROUND

The internal structures of houses and other buildings are commonly protected from environmental elements by exterior siding materials. These siding materials are typically planks or panels composed of wood, concrete, brick, aluminum, stucco, wood composites, or fiber-cement composites. Some common fiber-cement composites are fiber-cement siding, roofing, and trim which are generally composed of cement, silica sand, unbleached wood pulp, and various additives. Fiber-cement products offer several advantages over other types of materials, such as wood siding, because they are weatherproof, relatively inexpensive to manufacture, fire-resistant, and invulnerable to rotting or insect damage.

Most commercial fiber-reinforced cement siding products are made using the Hatsheck process. The Hatsheck process was initially developed for the production of asbestos composites, but it is now used for the manufacture of non-asbestos, cellulose fiber reinforced cement composites. In this process, bales of unbleached cellulose pulp fibers are re-pulped in water to provide substantially singulated fibers. The re-pulped fibers are refined and then mixed with cement, silica sand, clay, and other additives to form a mixture. The fiber-cement mixture is deposited on a felt band substrate, vacuum dewatered, layered and in some cases pressed, and then cured to form a fiber reinforced cement matrix in sheet form. The form may have the appearance of standard beveled wood siding.

Other commonly used fiber cement manufacturing processes known to those skilled in the art are: the Magnani process, extrusion, injection molding, hand lay-up, molding and the Mazza pipe process.

Cellulose pulp fibers have two roles in the manufacture of fiber cement products.

Cellulose pulp fibers act as a filter medium in the cement mixture slurry during the drainage process on the forming wire to help retain cement and silica particles while the excess water is being removed from the cement suspension. If there is no filter medium then a great deal of the solids from the slurry will be lost with the water during the drainage process. The purpose of the filter medium is to retain the cement mixture within the product while removing the water.

The fibers also reinforce the cement product. The fiber cement board manufacturers want good strength and good flexibility in the cement board. Strength is indicated by the modulus of rupture of the board. Flexibility is shown by the deflection of the board at maximum load. Maximum load is the amount of force that can be applied to the board before it breaks. Deflection at maximum load is how far the board deflects from the horizontal plane of the board before breaking in three point bending.

A standard against which other cellulose chemical pulp fibers are measured is the Douglas fir unbleached chemical pulp fiber. Other fibers must be comparable with Douglas fir unbleached chemical pulp fiber in modulus of rupture, maximum load and deflection at maximum load if they are to be considered for use in fiber cement board.

Fiber cement boards made with bleached cellulose pulp fibers usually have high strength but are brittle, resulting in poor flexibility. These boards tend to break if flexed and also tend to break when nailed. It would be advantageous to provide a fiber cement board made with bleached cellulose chemical pulp fibers that exhibits both high strength and good flexibility.

DESCRIPTION

The fiber cement boards of the present invention may be manufactured by any of a number of processes. Typical processes are the Hatsheck process, the Magnani process, extrusion, injection molding, hand lay-up, molding and the Mazza pipe process.

In the manufacture of fiber cement board, bales of cellulose pulp fibers are re-pulped in water to provide substantially singulated fibers. The re-pulped fibers are refined and then mixed with cement, silica sand, and other additives to form a mixture. The mixture is then formed into a fiber cement board. In one process the fiber-cement mixture is deposited on a felt band substrate, vacuum dewatered, and cured to form a fiber reinforced cement matrix in sheet form. The sheets may take the form of standard beveled wood siding. They may also take the form of building sheets, panels, planks and roofing.

The usual composition of the fiber cement board is 10 to 90% by weight cement, 20 to 80% by weight silica sand, and 2 to 18% by weight cellulose pulp fibers. The other additives that are usually found in the fiber cement board are: density modifiers, weight modifiers, flame retardants, clay, kaolin, metakaolin, silica fume, fly ash, defoamers, viscosity modifiers, light weight aggregates, perlite, vermiculite, mica, pumice, ash, flocculants, alum, alumina trihydrate, waterproofing agents, wollastonite, calcium carbonate, resins, pigments, diatomaceous earth and resins.

The proportion of the cementitious binder, aggregate, density modifiers, and additives can be varied to obtain optimal properties for different applications, such as roofing, deck, fences, paving, pipes, siding, trim, soffits, backer for tile underlayment. For an air-cured product, a higher percentage of cement can be used, more preferably about 60-90%. In an air-cured embodiment, the fine ground silica is not used, although silica may be used as a filler.

The cementitious binder is preferably Portland cement but can also be, but is not limited to, high alumina cement, lime, high phosphate cement, and ground granulated blast furnace slag cement, or mixtures thereof. The aggregate is preferably ground silica sand but can also be, but is not limited to, amorphous silica, micro silica, silica fume, diatomaceous earth, coal combustion fly and bottom ashes, rice hull ash, blast furnace slag, granulated slag, steel slag, mineral oxides, mineral hydroxides, clays, magnasite or dolomite, metal oxides and hydroxides and polymeric beads, or mixtures thereof.

The density modifiers can be organic and/or inorganic lightweight materials. The density modifiers may include plastic hollow materials, glass and ceramic materials, calcium silicate hydrates, microspheres, and volcano ashes including perlite, pumice, shirasu balloons and zeolites in expanded forms. The density modifiers can be natural or synthetic materials. The additives can include, but are not limited to, viscosity modifiers, fire retardants, waterproofing agents, silica fume, geothermal silica, thickeners, pigments, colorants, plasticizers, forming agents, flocculents, drainage aids, wet and dry strength aids, silicone materials, aluminum powder, clay, kaolin, alumina trihydrate, mica, metakaolin, calcium carbonate, wollastonite, and polymeric resin emulsion, or mixtures of thereof.

Usually unbleached Douglas fir chemical pulp fibers are used in the manufacture of fiber cement board. These have been found in the industry to provide the best combination of modulus of rupture, maximum load and deflection at maximum load.

If unbleached Douglas fir cellulose pulp fibers are in short supply then it is necessary to find other pulp fibers that can be used. Usually other unbleached cellulose pulp fibers having lengths similar to Douglas fir have been used. Redwood is an example.

Bleached softwood chemical pulp fibers have been considered because of their length but have not been used because they tend to result in brittle boards. They tend to have strength that is the same or slightly higher than unbleached Douglas fir chemical pulp fiber but usually have flexibility that is far less than unbleached Douglas fir chemical pulp fibers.

The present invention can utilize a number of pulp fibers. Coniferous and broadleaf species can be used. These are also known as softwoods and hardwoods. Softwoods would normally be used because they have longer fibers than hardwoods. Typical softwood species are spruce, fir, hemlock, tamarack, larch, pine, cypress and redwood. Typical hardwood species are ash, aspen, cottonwood, basswood, birch, beech, chestnut, gum, elm, maple and sycamore. Recycled cellulosic material can be used as starting material for the fibers. The present invention can use chemical, mechanical, thermomechanical and chemithermomechanical pulp. Kraft, sulfite and soda chemical pulps can be used. The fibers can be bleached or unbleached. The present invention can be used with unbleached Douglas fir chemical pulp fibers.

Usually, softwood or coniferous species will be used because of fiber length. Hardwood or broadleaf species have a fiber length of 1-2 mm. Softwood or coniferous species have a fiber length of 3.5 to 7 mm. Douglas fir, grand fir, western hemlock, western larch, and southern pine have fiber lengths in the 4 to 6 mm range. Pulping and bleaching may reduce the average length slightly because of fiber breakage.

In the manufacture of pulp woody material is disintegrated into fibers either in a chemical or mechanical type process. The fibers can then be optionally bleached. The fibers are then slurried with water in a stock chest, The slurry then passes to a headbox and is then placed on a wire, dewatered and dried to form a pulp sheet. Additives may be combined with the fibers in the stock chest, the headbox or both. Materials may also be sprayed on the pulp sheet before, during or after dewatering and drying.

The fibers of the present invention are treated with a material in either the stock chest or the headbox.

The material is a globular cationic or nonionic oil. The oil can be either a vegetable oil or a mineral oil. It may be treated with a surfactant in order to form the globules and to provide the cationic character. The amount of oil added to the pulp is two to five kg of oil per ton of bleached sulfate pulp and one to three kg of oil per ton of bleached sulfite pulp.

The vegetable oils that might be used would be any vegetable oil that is liquid at the drying temperature of pulp, around 100° C. Vegetable oils that might be used could include, among others, apricot oil, argan oil, artichoke oil, babassu oil, ben oil, bladder pod oil, Borneo tallow nut oil, bottle gourd oil, buffalo gourd oil, canola oil, carob pod oil, caster oil, coconut oil, copaiba oil, corn oil, cottonseed oil, crambe oil, cuphea oil, false flax oil, flaxseed oil, grapeseed oil, hempseed oil, honge oil, jatropha oil, jojoba oil, kapok seed oil, mango oil, meadowfoam seed oil, milk bush oil, mustard oil, okra seed oil, olive oil, nut oils, palm oil, palm kernel oil, peanut oil, petroleum nut oil, quinoa oil, radish oil, ramtil oil, rapeseed oil, rice bran oil, sesame oil, soybean oil, and tall oil.

A fiber cement board which incorporates a bleached pulp fiber treated with globules of cationic or nonionic oil that have been attached to the fibers, could have a modulus of rupture that is comparable to a fiber cement board that incorporates an unbleached Douglas fir chemical pulp fiber or a fiber cement board that incorporates a bleached fiber treated with a quaternary ammonium dispersant, and could have a deflection at maximum load that is much higher than a fiber cement board that incorporates unbleached Douglas fir chemical pulp fiber or a fiber cement board that incorporates a bleached fiber treated with a quaternary ammonium dispersant. The deflection of the oil boards with oil treated fibers could be more than double either of the other boards. The impact strength of the boards with oil treated fibers could be greater that of the boards with bleached fiber or the boards with bleached fiber treated with a quaternary ammonium dispersant or boards with the standard unbleached Douglas fir fiber.

While not wishing to be bound by theory, it is believed that the reason the higher deflection could be obtained is that the larger globules coat the entire fiber and allow the fiber to move with respect to the cement board in the fiber cement board. This maximizes the frictional force energy of the fiber within the matrix instead of binding it tightly to the matrix resulting in the tensile strength of the fiber becoming the only component to resist the load. This would allow the fiber cement board to have a greater deflection than a fiber which attaches to the cement in the fiber cement board.

The invention claimed is:

1. A fiber-cement board comprising a cementitious binder, an aggregate and cellulose reinforcing fibers wherein the cellulose reinforcing fibers have been treated with cationic or nonionic oil prior to the addition of the fibers to the cementitious binder.

2. The fiber-cement board of claim 1 wherein the cellulose fiber is a cellulose chemical pulp fiber.

3. The fiber-cement board of claim 2 wherein the pulp fiber is a bleached pulp fiber.

4. The fiber-cement board of claim 1 wherein the cellulose fiber is a wood or wood pulp fiber other than Douglas fir or redwood.

5. The fiber-cement board of claim 1 wherein the oil is vegetable oil in the form of globules.

6. The fiber-cement board of claim 1 wherein the oil is a mineral oil in the form of globules.

\* \* \* \* \*